United States Patent [19]

Cochoy

[11] 3,960,814

[45] June 1, 1976

[54] POLY (PERFLUOROALKYLENE OXIDE) OXADIAZOLES AND THEIR SYNTHESIS

[75] Inventor: Robert E. Cochoy, Dayton, Ohio

[73] Assignee: The United States of America as represented by the Secretary of the Air Force, Washington, D.C.

[22] Filed: Feb. 27, 1975

[21] Appl. No.: 553,701

[52] U.S. Cl. .............................. 260/47 R; 260/2 R; 526/246; 526/258; 526/78
[51] Int. Cl.² ........................................ C08G 73/06
[58] Field of Search ............. 260/47 R, 78.4 N, 2 R

[56] References Cited
UNITED STATES PATENTS
3,317,484  6/1967  Fritz et al............................ 260/2 R
FOREIGN PATENTS OR APPLICATIONS
1,073,324  6/1967  United Kingdom................. 260/2 R Primary Examiner—Joseph L. Schofer
Assistant Examiner—Maria S. Tungol
Attorney, Agent, or Firm—Joseph E. Rusz; Cedric H. Kuhn

[57] ABSTRACT

A perfluoroalkylene oxide dinitrile, an aromatic dinitrile N-oxide and an aromatic trinitrile are terpolymerized to obtain a poly(perfluoroalkylene oxide) oxadiazole containing pendent aromatic nitrile groups. The fluorinated polymer product can be cured with a polyfunctional nitrile N-oxide to provide elastomers that are particularly useful in aircraft applications involving use temperatures ranging from about −70°F to about 400°F. For example, the elastomers can be employed as fuel tank sealants, coatings, O-ring seals, diaphragms, and the like.

14 Claims, No Drawings

000
POLY (PERFLUOROALKYLENE OXIDE) OXADIAZOLES AND THEIR SYNTHESIS

RIGHTS OF THE GOVERNMENT

The invention described herein may be manufactured and used by or for the Government of the United States for all governmental purposes without the payment of any royalty.

FIELD OF THE INVENTION

This invention relates to poly(fluoroalkylene oxide)oxadiazles containing pendent aromatic nitrile groups. In one aspect it relates to a process for synthesizing the fluorinated polymers. In another aspect it relates to a process for curing the fluorinated polymers.

BACKGROUND OF THE INVENTION

There exists a need for a material that will fulfill requirements for dynamic seal applications, e.g., O-rings, gaskets, diaphragms, and the like, as well as sealant applications, e.g., fuel tank sealants, coatings, and the like, for current and future high performance aircraft. For example, certain advanced aircraft will have hydraulic systems with seals that must withstand temperatures ranging from −70°F to 400°F.

Currently, only a fluorosilicone system is useful in the −70°F to 400°F range. However, this system is expensive to produce and is only of limited value in seal applications because of its tendency to revert and its poor dynamic performance. This latter deficiency of the system is due to its low tensile stregnth and low elongation. Considerable research has been conducted with the goal of deriving elastomer systems from perfluoroethers and dinitrile N-oxides that might overcome the deficiencies in the fluorosilicone system. However, such work has apparently been unsuccessful because any polymers obtained did not contain the pendent functional groups necessary for curing the polymers.

It is an object of this invention, therefore, to provide poly(perfluoroalkylene oxide)oxadiazles which can be crosslinked so as to provide useful elastomer systems.

Another object of the invention is to provide a process for synthesizing poly(perfluoroalkylene oxide)oxadiazoles containing pendent aromatic nitrile groups.

A further object of the invention is to provide a process for curing poly(perfluoroalkylene oxide)oxadiazoles containing pendent aromatic nitrile groups.

Still another object of the invention is to provide a fluorinated elastomer which is useful at temperatures ranging from about −70°F to 400°F and which possesses outstanding physical properties.

Other objects and advantages of the invention will become apparent to those skilled in the art upon consideration of the accompanying disclosure.

SUMMARY OF THE INVENTION

The present invention resides in a poly(perfluoroalkylene oxide)oxadiazole consisting essentially of repeating units having the following structural formula:

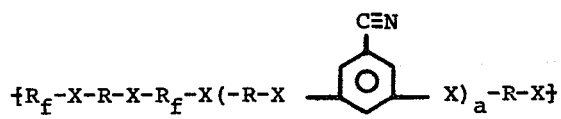

where $R_f$ is $-CF_2(OCF_2CF_2)_m-O-(CF_2)_5-O-(CF_2CF_2O)_n-CF_2-$, in which $m$ and $n$ are each an integer equal to at least 1 and the sum of $m$ and $n$ is in the range of 2 to 12, inclusive; where X is

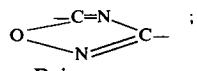

where R is

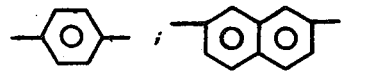

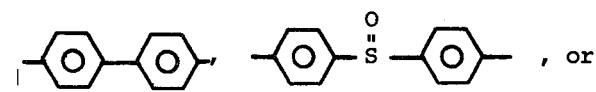

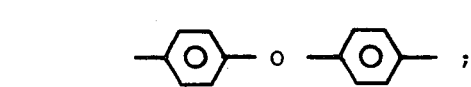

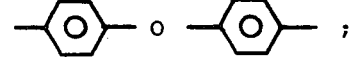

and where $a$ is in the range of 0.04 to 1.0. The number of repeating units is generally such that the polymer has an inherent viscosity of about 0.1 to 1.0 dl/g in hexafluoroacetone at 25°C.

In another embodiment, the invention lies in a process for synthesizing the polymer described in the preceding paragraph. Broadly speaking, the process comprises the steps of (1) adding to a reaction zone an aromatic dinitrile N-oxide; a perfluoroalkylene oxide dinitrile; 1,3,5-tricyanobenzene; and a fluorinated solvent in which the 1,3,5-tricyanobenzene is insoluble, and (2) after a period of time, adding to the zone a solvent, miscible with the fluorinated solvent, in which the 1,3,5-tricyanobenzene is soluble. After recovery from the reaction mixture, the polymer is cured, using a bis(nitrile oxide) as the curing agent.

As seen from the foregoing description, the process is carried out in two stages. In the first stage, the aromatic dinitrile N-oxide and the perfluoroalkylene oxide dinitrile react with one another in the fluorinated solvent in which both monomers and their condensation product are soluble. Because of its insolubility in this solvent, the 1,3,5-tricyanobenzene does not enter into the reaction. However, in the second stage, upon addition of the second solvent, the 1,3,5-tricyanobenzene reacts with the condensation product of the first stage, thereby forming a terpolymer as the product of the process. This latter condensation reaction is possible because the 1,3,5-tricyanobenzene is soluble in the second solvent which is also miscible with the fluorinated solvent. The reaction involved in the second stage is critical in that it results in a polymer chain having pendent nitrile groups. And it is the presence of the pendent nitrile groups that makes it possible to crosslink the polymer and thereby obtain a useful product having outstanding properites.

Although the condensation reactions can be carried out in air, they are preferably conducted under a vacuum, e.g., 0.5 to 300 mm of Hg, or under a blanket of an inert gases. Examples of inert gases that can be used include nitrogen, helium, argon, and the like. The reaction period for the first stage usually ranges from about 3 to 8 days, preferably from about 4 to 6 days. The total reaction period for the first and second stages generally falls in the range of about 4 to 13 days, preferably in the range of about 7 to 10 days. During both stages, the reaction temperature usually ranges from about 10° to 35°C, preferably from about 20° to 28°C. Generally, the reactions take place at ambient temperature, i.e., at about 24°C.

The amounts of the trinitrile, i.e., 1,3,5-tricyanobenzene, and the perfluoroalkylene oxide dinitrile that are charged to the reaction zone can vary within rather broad limits. In general, the trinitrile constitutes about 1 to 80, preferably 5 to 50, mole percent of the total amount of trinitrile and dinitrile charged to the reaction vessel. Equimolar amounts of the aromatic dinitrile N-oxide, based upon the total number of moles of trinitrile and dinitrile, can be employed although it is preferred to use a molar excess. While there is no limit as to the amount of excess aromatic dinitrile N-oxide that can be added, as a practical matter the mole ratio of the amount of dinitrile N-oxide to the amount of trinitrile and dinitrile generally ranges from about 1 to 1.25.

Examples of aromatic dinitrile N-oxides which can be used include N,N'-terephthalonitrile oxide; isophthalo-bis(nitrile N-oxide); 1,5-naphthalene-bis(nitrile N-oxide); 4,4'-biphenyl-bis-(nitrile N-oxide); 4,4'-benzonitrile oxide sulfone; and 4,4'-oxybis(phenylnitrile N-oxide). Aromatic dinitrile N-oxides are well known compounds which are described in the literature.

Exemplary perfluoroalkylene oxide dinitriles which can be utilized are those having the following formula:

$NC—CF_2(O—CF_2CF_2)_m—O—(CF_2)_5—O—(CF_2CF_2O)_n—CF_2CN$, in which $m$ and $n$ are each an integer equal to at least 1 and the sum of $m$ and $n$ is in the range of 2 to 12, inclusive. These compounds can be prepared from poly(perfluoroether)diacid fluorides by amidation and dehydration with phosphorus pentoxide. The poly(perfluoroether)diacid fluorides can be prepared from tetrafluoroethylene oxide according to procedures disclosed in U.S. Pat. Nos. 3,250,806 and 3,250,807.

The solvent used in the first stage of the process is a highly fluorinated hydrocarbon which is inert to and capable of dissolving the perfluoroalkylene oxide nitriles. Also, the solvent is one in which the 1,3,5-tricyanobenzene is substantially insoluble. Examples of such fluorinated hydrocarbons include trichlorotrifluoroethane, dichlorotetrafluoroethane, chloropentafluoroethane, dichlorotrifluoroethane and the like. In the second stage of the process, any hydrocarbon solvent can be used which is miscible with the fluorinated solvent and inert to the perfluoroalkylene oxide dinitriles and the aromatic dinitrile N-oxides. Also, the solvent is one in which the 1,3,5-tricyanobenzene is substantially soluble. Examples of such solvents include methylene chloride, chloroform, trichloroethane, and the like. The amount of solvents employed in the process is such that the reaction mixture can be readily stirred.

At the end of the reaction period, the polymer product is recovered by any suitable method. Thus, the polymer is in solution in the reaction mixture and can be recovered by filtration. In a preferred procedure, an amount of a fluorinated solvent sufficient to dissolve the polymer is added to the reaction mixture. The reaction mixture is then filtered, thereby giving a clear polymer solution. After concentrating the solution at ambient temperature in vacuo, the polymer is precipitated from solution by addition of a non-solvent for the polymer, such as methylene chloride. Thereafter, the polymer is purified by decanting the supernatant liquid, redissolving the precipitated polymer in a fluorinated solvent, and reprecipitating the polymer by addition of methylene chloride. After decanting the supernatant liquid, the polymer is dried. The drying can be readily accomplished by heating in an air oven and/or a vacuum oven for a period of 20 minutes to 2 hours at a temperature of 100° to 130°C.

Because the polymer product contains pendent nitrile groups it can be readily cured with a bis(nitrile oxide). Bis(nitrile oxides) suitable for use as curing agents have the following formula:

$R(CNO)_2$, where R is alkylene, cycloalkylene, arylene, aralkylene, alkarylene, alkylene-diarylene, cycloalkylene-dialkylene, arylene-dialkylene, alkylene-oxy-alkylene, arylene-oxy-arylene, alkylene-oxy-arylene, alkarylene-oxy-arylene, alkarylene-oxy-alkarylene, and the corresponding thio and sulfonyl analogs. Examples of suitable R groups include 1,3-phenylene, 1,4-phenylene, methylene, ethylene, cyclohexylene, phenylethylene, methylphenylene, xylylene, methylenediphenylene, ethylene-oxy-ethylene, methylphenylene-oxyphenylene, phenylene-oxy-phenylene, ethylene-oxy-phenylene, ethylene-thio-ethylene, phenyl-thio-phenylene, ethylene-sulfonyl-ethylene, phenylene-sulfonyl-phenylene, and the like.

It is also within the scope of the invention to employ as the curing agents bis(difunctionalnitrile oxides) having the following formulas:

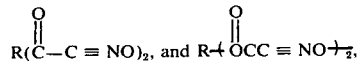

where R is as indicated above. It is to be understood that in the crosslinking reaction that occurs during curing only the nitrile oxide groups are involved. Thus, the curing of the polymers readily occurs regardless of the particular R group contained in the compounds represented by the foregoing formulas. However, it is usually preferred to use a bis(nitrile oxide) in which R is 1,4-phenylene, i.e., N,N'-terephthalonitrile dioxide.

Curing of the polymer product is accomplished by initially blending the polymer with the curing agent. The blending operation can be carried out on a roll mill, a Banbury mixer or other suitable apparatus. From about 0.5 to 10, preferably 3 to 5, weight percent of the curing agent, based on the weight of the polymer, is utilized. After the curing agent and polymer have been thoroughly blended, the resulting homogeneous mixture is heated at a temperature ranging from about 100° to 300°F, preferably from about 175° to 225°F, for a period of time to affect the desired crosslinking. Depending upon the temperature, a period of about 10 to 60 minutes is usually sufficient to cure the polymer and provide an elastomer having outstanding properties. It is within the scope of the invention to add a filler, such as silica, carbon black, titanium dioxide and the like, during the blending operation. The amount of filler added usually ranges from about 5 to 100 weight percent, based upon the weight of the polymer.

A more complete understanding of the invention can be obtained by referring to the following illustrative examples which are not intended, however, to be unduly limitative of the invention.

EXAMPLE I

Preparation of N,N'Terephthalonitrile Dioxide a. Terephthalhydroximoyl Chloride

Terephthaldioxime (13.2 g, 0.08 mole, mp 226°–229°C) and 675 ml of 8NHCl were placed in a two-liter, three-necked flask equipped with an efficient mechanical stirrer, thermometer, fritted glass gas inlet tube leading well below the surface of the liquid, and a gas outlet tube leading to a bubbler. With stirring and with nitrogen gas being bubbled slowly through the suspension, the reaction mixture was cooled to 0°C in an ice/salt bath. Chlorine gas was then bubbled slowly through the vigorously stirred suspension for 6 hours. Foaming can be controlled, if necessary, by addition of several milliliters of ether. At the end of the 6 hour chlorination, the ice/salt bath was removed and nitrogen was again bubbled through the suspension while it was allowed to warm to ambient temperature. The crude material was filtered, washed with water, and air dried ovenight. The material was then taken up in 200 ml of ether, and dried with anhydrous magnesium sulfate. After filtering and evaporating the ether solution to dryness, there remained 16.7 g of slightly off-white solid, mp 174°–177°C. The solid was again taken up in ether and precipitated with hexane to yield 14.8 g (80%) of crude, off-white terephthalhydroximoyl chloride, mp 178°–180°C. Material prepared in this manner was converted to TPNO as described below and used in polymer runs A through K described in Example III.

Purer terephthalhydroximoyl chloride (mp 188°–190°C) was prepared by recrystallizing the crude material from toluene (1g/100 ml). The white terephthalhydroximoyl chloride purified in this manner was converted to TPNO as described below and was used in polymer runs L through R described in Example III.

Analysis: Calc'd for $C_8H_6N_2O_2Cl_2$: C,41.23; H,2.60; N,12.02; Cl, 30.43

Found : C,41.24; H,2.52; N,12.02; Cl,29.46 b. N,N'Terephthalonitrile Dioxide (TPNO)

To a 300 ml, three-necked, round bottomed flask equipped with a magnetic stirrer, a thermometer, and a 125 ml dropping funnel topped with a drying tube was added triethylamine (6.1 g, 60 mmoles) and ether (150 ml). The solution was cooled to −5°C in an ice/salt bath and a solution of terephthalhydroximoyl chloride (4.7 g, 20 mmoles) in ether (75 ml) was added dropwise at −5°C with rapid stirring over a period of 20 minutes. The resulting white suspension was stirred an additional 40 minutes at −5°C. Cold distilled water (30 ml) was then added and the suspension was stirred an additional 20 minutes at 0°to −5°C and was then filtered on a sintered glass filter. The nearly white solid was washed thoroughly on the filter with cold distilled water (3 × 25 ml) and cold ether (3 ×0 25 ml) and was then dried in a vacuum desiccator for 2 ¼hours (0.7 mm Hg) to yield 3.1 g (95%) of nearly white, fluffy terephthalonitrile oxide (TPNO). (As a word of caution, the dry material decomposed explosively when heated to 155°C in air).

The infrared spectrum exhibited no absorption due to polymeric forms of TPNO.

Analysis: Calc'd for $C_8H_4N_2O_2$: C,60.00; H,2.53; N,17.48

Found: C,59.70; H,2.38; N,17.41

EXAMPLE II

Preparation of Perfluoroalkylene Oxide Nitriles a. Ether Diacid Fluorides (EDAF)

A three-liter, three-necked flask was equipped with a rubber septum, thermometer well, magnetic stirrer and vacuum outlet. Cesium fluoride (10 g) was charged to the flask and dried overnight under full mechanical pump vacuum at 250°C. Tetraglyme (200 ml), dried over molecular sieves, and perfluoroglytaryl fluoride (PFGF) (450 g, 1.84 mmoles) were added to the cesium fluoride. Tetrafluoroethylene oxide (TFEO) was added to the reaction mixture at −20°C. Weighing of the bottom layer of the reaction mixture (1987 g) showed that 1537 g of TFEO had been added to the PFGF. GLC analysis of the crude origometric mixture showed the following composition:

| Oligomer | Wt % by GLC |
| --- | --- |
| 4-EDAF | 2.3 |
| 5-EDAF | 13.5 |
| 6-EDAF | 15.6 |
| 7-EDAF | 23.3 |
| 8-EDAF | 33.1 |
| 9-EDAF | 8.3 |

The oligomeric mixture was fractionally distilled using a four-foot Oldershaw column. Sixteen fractions were recovered including the following:

| Fraction | Boiling Range °C/mm | GLC | Wt, g |
| --- | --- | --- | --- |
| 4 | 170–120/11 | 99% 5-EDAF | 101 |
| 13 | 106–109/0.g–0.8 | 98% 8-EDAF | 404 |
| 14 | 109–119/0.8–0.9 | 98% 8-EDAF | 140 |
| 16 | 125–129/1.0–1.1 | 95.3% 9-EDAF | 224 |
| 16 | | 3.7% 8-EDAF | | b. Preparation of 5-EDAF Dinitrile

Ammonia was bubbled through a solution of 5-EDAF (100 g, 0.13 mole) in ethyl ether (1 liter) until the refluxing ammonia lowered the temperature of the pot to 0°C. The solution was filtered and evaporated to give the diamide.

The diamide (92 g) was mixed with phosphorus pentoxide (200 g) and heated to 200°C under 20 mm Hg. After refluxing (110°C/20 mm Hg) for 40 minutes, the product was distilled. GLC analysis showed the product to have a purity of 99.5%. Infrared analysis showed the product (5-EDAF dinitrile) to be: $NCCF_2(OCF_2CF_2)_mO(CF_2)_5O(CF_2CF_2O)_n-CF_2CN$, where m+n=3.

c. Preparation of 8-EDAF Dinitrile

8-EDAF (140.7 g) was dissolved in Freon TF solvent (200 ml) (trichlorotrifluoroethane) in a 500 ml, three-necked flask equipped with magnetic stirrer, thermometer, Dry Ice-acetone condenser and ammonia-nitrogen sweep. Ammonia was slowly passed into the system. Initially a small amount of precipitate was observed. At one point a vigorous reflux occurred which was followed immediately by solidification of the reaction mixture. Addition of ammonia was continued until the pot temperature fell from a high of 49°C to −10°C, and the pot contents had assumed a stirrable consistency. However, solids still remained in the solution. The slurry was filtered and the Freon TF was evaporated. The residue was melted under full vacuum (0.05 mm Hg) to remove the last traces of ether. The diamide product (131.5 g, 94% of theory) melted sharply at 66°C. Analysis: Calc'd for $C_{21}H_4F_{38}N_2O_{10}$: C,21.62; H,0.34; N,2.40

Found: C,21.98; H,0.38; N,2.44

The diamide (65 g, 55.7 mmoles) was added to a 100 ml, one-necked flask and covered with phosphorus pentoxide (50 g). The flask was equipped with a vacuum distillation head evacuated to full volume and gradually heated using a silicone oil bath. As the bath temperature approached 150°C, reflux was observed. At full reflux the head temperature was observed to be 97°C/0.03 mm Hg. The product was collected from 95°–102°C/0.03 mm Hg to give 55 g of distillate (87.3% of theory). Infrared analysis showed this material to contain a trace of amide. It was redistilled from a few grams of phosphorus pentoxide (boiling poing 72°C/0.03 mm Hg) to give 51.8 g (82.2% of theory) of distillate. GLC analysis showed the distillate to be 94.33% 8-EDAF dinitrile. Infrared analysis showed the product (8-EDAF dinitrile) to be:

$$NCCF_2(OCF_2CF_2)_mO(CF_2)_5O(CF_2CF_2)_nCF_2CN,$$
where m+n=6.

d. Preparation of 9-EDAF Dinitrile

A 500 ml, 3-necked flask containing a magnetic stirring bar was charged with ethyl ether (250 ml) and 9-EDAF (132.6 g, 0.103 mole ). The flask was then fitted with a thermometer, a low temperature refux condenser vented to a −183°C trap, and a gas inlet connected to a cylinder of ammonia. As the immiscible liquids in the flask were stirred, ammonia was admitted as an outgas. A vigorous reaction took place when the liquid ammonia refluxed into the reaction mixture.

During the early part of the reaction, a suspension of a white, granular solid was formed in the reaction mixture. However, as the reaction progressed, the particles became less distinct and a slightly pasty suspension was formed. After completion of the reaction, the reflux condenser and thermometer was replaced with stoppers and a full vacuum was applied to emove excess ammonia and ether.

After several milliliters of ether had been removed, the product mixture suddenly became solid. Warming the material slightly above room temperature did not cause it to liquify. It was found that the product formed an emulsion in Freon TF and that it was completely soluble in acetone.

The amide was isolated by emulsifying the product mixture with Freon TF in a separatory funnel, adding small increments of acetone until two distinct liquid layers formed, and evaporating the bottom layer to dryness. The white solid which was isolated was mixed with an equal weight of phosphorus pentoxide in a 500 ml flask and then covered with a layer of phosphorus pentoxide. The flask was fitted with a strip condenser which emptied into another flask. A full vacuum was applied as the amide-$P_2O_5$ mixture was heated in an oil bath. A small amount of liquid product was obtained at a bath temperature of 160°C with the major portion obtained at a bath temperature of 180°–200°C. GLC analysis of the product indicated a purity of 95.2%. Infrared analysis showed the product (9-EDAF dinitrile) to e:

$$NCCF_2(OCF_2CF_2)_mO(CF_2)_5O(CF_2CF_2)_nCF_2CN,$$
where m+n=7.

Analysis: Calc'd for $C_{23}F_{42}N_2O_9$: C,22.15; N,2.25
Found: C,22.17; N,2.86

EXAMPLE III

A series of runs was conducted in which the poly(perfluoroalkylene oxide)oxadiazoles of this invention were prepared. The monomers and solvents and the amounts utilized as well as the reaction periods for the first and second stages are shown below in Table I. Also indicated in the table are the yields obtained and the appearance of the polymer product. There is set forth below a description of Run I. The same general procedure was followed in carrying out Runs B through R. It is noted that Run A is a control run in which 1,3,5-tricyanobenzene was not added.

To a dry 250 ml indented, single-necked, round bottomed flask equipped with a magnetic stirring bar was added, N,N'-terephthalonitrile oxide (TPNO, 2.36 g, 14.7 mmoles) and 1,3,5-tricyanobenzene (0.551 g, 3.6 mmoles) along with Freon TF solvent (50 ml). A solution of 8-EDAF dinitrile [NC-$CF_2(OCF_2CF_2)_m$—O—$(CF_2CF_2O)_n$—CF CN, m+n=6, 12.84 g, 1.35 mmoles] in Freon TF solvent (20 ml) was added all at once to the TPNO/trinitrile suspension. The flask was capped with a vacuum adapter and, with stirring, the flask was alternately evacuated (to 300 mm Hg) and flushed with dry nitrogen. The flask was then sealed off, disconnnected from the nitrogen line, and allowed to stir at ambient temperature for 4 days. Forty ml of methylene chloride was then added to the suspension and stirring was continued for an additional 3 days. Thirty ml of Freon TF was then added and the suspension was filtered on a Buchner funnel, giving a clear polymer solution. The clear solution was concentrated at ambient temperature in vacuo and the polymer was precipitated by the addition of methylene chloride. The supernatant liquid was decanted and the precipitated polymer was redissolved in Freon TF solvent (50 ml) and reprecipitated with methylene chloride (110 ml). After decanting the supernatant liquid, the polymer was dried for 20 minutes at 120°C in an air oven and for 1 ½ hours at 115°C/1.0 mm Hg. The tough, pale yellow gum (10.8 g, 70%) had an inherent viscosity of 0.22 dl/g in hexafluoroisopropanol at 25.0°C.

The infrared spectrum (film cast from Freon TF) showed $\nu$max 1610, 1550, 1460, 1330, 1250–1110, 990, 960, 900, 880, and 860 cm$^{-1}$. A portion of the gum was further dried at 180°C/0.1 mm Hg for 6 hours to provide a sample for Tg determination and elemental analysis. The polymer gum showed a glass transition temperature Tg) of −64°C with a possible crystal phase melting point (Tm) at 33°C. The calculated values for the following elemental analysis are based on the incorporation of one trinitrile group for every six 8-EDAF dinitrile groups in the polymer chain.

Analysis: Calc'd for 6:1:7 EDAF dinitrile:trinitrile:TPNO polymer
composition:
C,28.48; H,0.39; N,5.04
Found: (Run I): C,27.99; H,0.41; N,4.54

TABLE I

POLYMERIZATION RESULTS[1]

| RUN | EDAF dinitrile/ mmoles | 1,3,5-tri-cyano-benzene mmoles | TPNO mmoles | Freon TF Solvent ml | First Stage time, days | CH$_2$Cl$_2$ Solvent ml/added | Second Stage time, days | Polymer Appearance (yield,%)[2] |
|---|---|---|---|---|---|---|---|---|
| A | 8-EDAF dinitrile/ 2.3 | 0 | 2.27 | 21 | 5 | 0 | — | colorless oil (98) |
| B | 8-EDAF dinitrile/ 3.2 | 1.4 | 4.9 | 26 | 4 | 0 | — | colorless[3] oil |
|   | 8-EDAF dinitrile/ 3.2 | 1.4 | 4.9 | 26 | 8 | 0 | — | viscous oil |
|   | 8-EDAF dinitrile/ 3.2 | 1.4 | 4.9 | 26 | 8 | 25 | 2.5 | elastomeric gum |
| C | 8-EDAF dinitrile/ 4.6 | 1.5 | 6.2 | 35 | 6 | 15 | 5 | crepe gum elastomeric (61) |
| D | 8-EDAF dinitrile/ 9.4 | 3.0 | 12.5 | 70 | 6 | 40 | 4 | crepe gum elastomer (50) |
| E | 5-EDAF dinitrile/ 9.4 | 3.0 | 12.5 | 70 | 6 | 40 | 4 | paraffin-like white solid (54) |
| F | 8-EDAF dinitrile/ 9.4 | 3.0 | 12.5 | 70 | 4 | 40 | 3 | tough gum (71) |
| G | 9-EDAF dinitrile/ 9.4 | 3.0 | 12.5 | 70 | 4 | 40 | 3 | tacky gum (59) |
| H | 9-EDAF dinitrile/ 9.4 | 0.75 | 10.3 | 70 | 4 | 40 | 3 | sticky sealant grade matr (82) |
| I | 8-EDAF dinitrile/ 11.35 | 3.6 | 14.8 | 70 | 4 | 40 | 3 | tough gum (70) |
| J | 8-EDAF dinitrile/ 11.3 | 3.6 | 15.2 | 70 | 4 | 40 | 3 | tough crepe gum elastomer (55) |
| K | 8-EDAF dinitrile/ 11.3 | 3.6 | 15.5 | 70 | 5 | 40 | 3 | tough crepe gum (68) |
| L | 8-EDAF dinitrile/ 11.3 | 3.6 | 15.7 | 70 | 5 | 40 | 3 | slightly tacky gum (61) |
| M | 8-EDAF dinitrile/ 5.75 | 1.8 | 8.0 | 35 | 3 | 20 | 5 | tough gum (28)[5] |
| N | 8-EDAF dinitrile/ 5.75 | 1.8 | 8.0 | 35 | 7[6] | 5 | — | (0)[6] |
| O | 8-EDAF dinitrile/ 22.6 | 7.5 | 31.2 | 105 | 4 | 55 | 3 | tacky gum (60) |
| P[1] | 8-EDAF dinitrile/ 18.1 | 7.2 | 26.2 | 84 | 4 | 44 | 3 | tacky gum (60) |
| Q | 8-EDAF dinitrile/ 7.0 | 5.0 | 12.5 | 70 | 4 | 40 | 3 | tacky gum (37) |
| R | 8-EDAF dinitrile/ 7.0 | 5.0 | 12.5 | 70 | 6 | 40 | 4 | tough, crepe gum (30) |

[1]Polymer reactions were magnetically stirred in a stoppered single-necked indented round bottomed flask at ambient temperature (25°C) except for Run P which was vigorously shaken on a Burrel wrist shaker.
[2]Except for Runs A and B, all yields are of fractionated polymer and are based on the EDAF dinitrile charged.
[3]No yields are reported on Run B since aliquots were removed periodically.
[4]Inadvertent heating of the gum in contact with TPNO during the fractionation caused some loss in yield of the final gum.
[5]Polymer partially crosslinked during the long second stage time causing large loss during filtration.
[6]The 5 ml CH$_2$Cl$_2$ was added at the beginning of the polymerization along with the other reactants. Polymer crosslinked in pot.

EXAMPLE IV

A series of runs was carried out in which the elastomeric polymers prepared as described in Example III were cured. The amounts of curing agent (TPNO), curing conditions and physical properties are shown below in Table II. Also included in the table are comments regarding the cured elastomers as well as description of tests made in certain of the runs. There is set forth below the procedure followed in curing the elastomer prepared in Run I of Example III. The same general procedure was followed in curing other elastomeric polymers of Example III.

The gum prepared in Run I was blended with 3 weight percent TPNO (based on the weight of the gum) on a laboratory micromill. The homogeneous mixture obtained was then press cured for 20 minutes at 200°C.

Samples of the cured sheet of elastomer were suspended in two different hydraulic fluids for 72 hours with the following results:

| Temp,°F | Hydraulic Fluid | Volume change, % |
|---|---|---|
| 275 | Mil-H-5606 | +5.6 |
| 350 | Mil-H-83282 | −1.6 |

TABLE II

CURING RESULTS[1]

| Polymer Run | Parts of TPNO Per 100 Parts Polymer Gum | Compression Set, 24 hrs at 400°F, 25% Deflect | Filler (parts/100) | Press Cure (min/°F) | Tensile Strength, psi | Percent Elongation at Break | Shore A Hardness |
|---|---|---|---|---|---|---|---|
| B | 1[2] | — | — | 120/200 | 580 | 765 | |
| C | 3[3] | — | — | 20/200 | 1267 | 625 | |
| D | 3[4] | 100 | — | 10/200 | 1455 | 560 | |
|   | 5 | 105(67) | — | 15/200 | 1450(1090) | 480(380) | |
|   | 3 | — | — | 15/160 | 1120 | 400 | |
| E | 3[5] | 75.8(64.2) | — | 20/200 | 1705(1815) | 430(435) | |
| F | 3[6] | (84.2) | — | 20/200 | 1215(1045) | 640(465) | |

TABLE II-continued

CURING RESULTS[1]

| Polymer Run | Parts of TPNO Per 100 Parts Polymer Gum | Compression Set, 24 hrs at 400°F, 25% Deflect | Filler (parts/100) | Press Cure (min/°F) | Tensile Strength, psi | Percent Elongation at Break | Shore A Hardness |
|---|---|---|---|---|---|---|---|
| G | 3[7] | — | — | 30/200 | 410 | 660 | |
| | 3[8] | — | — | 30/200 (air crd) | — | — | |
| H | 3[9] | — | — | 30/200 (air crd) | — | — | |
| | 3[10] | — | — | 120/200 (air crd) | 240 | 475 | |
| I | 3[11] | — | — | 20/200 | 1160 | 685 | |
| J | 3[12] | — | — | 30/200 | 1045 | 215 | |
| | 3[13] | — | HiSilEP[21] (20) | 30/200 | 2425(2270) | 260(400) | |
| | 3[14] | 120(100) | HiSilEP (20) | 30/200 | 2175(2085) | 420(410) | |
| K | 5[15] | 113(105) | HiSilEP (20) | 30/200 | 1775 | 350 | 75 |
| | 3[16] | — | HiSilEP (20) | 45/200 | — | — | — |
| L | 3[17] | 125(103) | HiSilEP (20) | 45/200 | 2200(1920) | 595(650) | 70(65) |
| P | 3[18] | — | — | 30/200 | 725 | 645 | 48 |
| | 6 | — | — | 30/200 | 1000 | 835 | 52 |
| Q | 3[19] | 110 | — | 30/200 | 1145 | 600 | 52 |
| R | 3[20] | — | — | 30/200 | 1330 | 370 | 65 |

[1]Physical properties were determined on three test specimens averaged. Values in parentheses indicate test values obtained after postcuring 24 hrs at 400°F.
[2]Unfractionated gum, no scorching.
[3]Fractionated gum, TGA on cured sample flat up to 500°F.
[4]Doubly fractionated gum, TR-10=—73°F.
[5]TPNO dispersed in Freon TF solution of gum. Freon then removed in vacuo. Set at break = 300% (245%) on cured and postcured samples.
[6]TR-10=—73°F, TF-20=—67°F, TR-30=—64°F.
[7]Set at break = 18%, cured sample stiffened or crystallized upon standing.
[8]Used a 50:50 blend of gum from Runs G and H. TPNO was mixed with warm gum and mixture trowled onto B-120 titanium test strip. Cured well in air oven. No corrosion of test strip after 200 hrs at 400°.
[9]Sealant strip prepared as in Run G. No stress corrosion of B-120 titanium test strip after 1000 hrs at 400°F.
[10]Sealant test strip cured in air oven. Strip contained pinholes from escaping air or solvent. Set break = 0%.
[11]Tg =—83°F.
[12]Slightly scorched.
[13]Scorched.
[14]100% Modulus = 505, set at break = 20%(10%) on cured and post-cured samples, respectively.
[15]Sample judged to be overcured. Set at break = 15%.
[16]Two −214 size O-rings were molded for compression set determination, Comp set (24 hrs at 325°F) = 84.4%. Comp set (24 hrs at 350°F) = 94.4%. O-rings were postcured at 350°F before tests.
[17]Set at break = 30% (10%) on cured and postcured samples, respectively.
[18]Set at break = 10%.
[19]Set at break = 5%.
[20]Set at break = 0%.
[21]Hydrated amorphous silica, a product of PPG Co., Pittsburg, Pa.

The data in Table 1 show that in the absence of 1,3,5-tricyanobenzene (Run A) an oil rather than a solid polymer product is obtained. In general, the data indicate that elastomeric polymers are obtained in good yields as products of the process. However, as seen from Run N, it is critical that the second solvent, in which 1,3,5-tricyanobenzene is soluble and which is miscible with the first solvent (fluorinated solvent), be added after the EDAF dinitrile and TPNO have reacted.

As seen from the data in Table II, the polymers of Example III were readily cured with TPNO to give cured elastomers having good physical properties. As in the case of fluorisilicone systems, there was no tendency on the part of the products to revert and they possessed relatively good tensile strengths and high percentages of elongation. The low TR-10 measurements (temperature at which a stretched sample of elastomer retracts 10%) are particularly significant since they demonstrate the flexibility and, therefore, the utility of the products at very low temperatures. Also, thermogravimetric analysis (TGA) data indicate that the products can withstand high temperature with substantially no weight loss.

In view of the foregoing disclosure, various modifications of the invention can be made by those skilled in the art without departing from the spirit and scope of the invention.

I claim:

1. A poly(perfluoroalkylene oxide)oxadiazole consisting essentially of repeating units having the following structural formula: $R_f$-X-R-X-$R_f$-x(-R-X

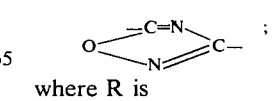

where $R_f$ is —$CF_2(OCF_2CF_2)_m$—O—($CF_2$)$_5$—O—($CF_2CF_2O)_n$—$CF_2$—, in which $m$ and $n$ are each an integer equal to at least 1 and the sum of $m$ and $n$ is in the range of 2 to 12, inclusive; where x is $$O \diagup^{-C=N}_{-N}\diagdown C-$$

where R is

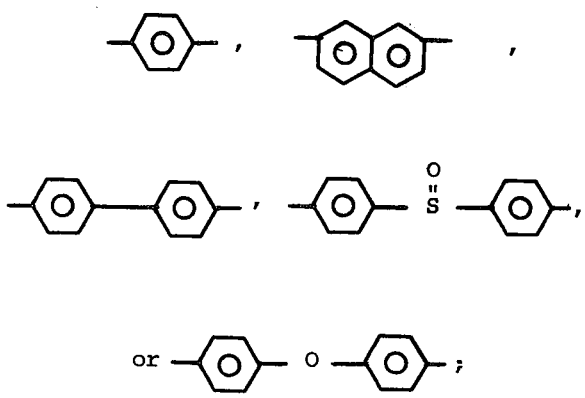

and where *a* is in the range of 0.04 to 1.0.

2. The poly(perfluoroalkylene oxide)oxadiazole of claim 1 in which R is

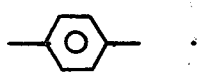

3. The poly(perfluoroalkylene oxide)oxadiazole of claim 1 in which R is

4. The poly(perfluoroalkylene oxide)oxadiazole of claim 1 in which R is

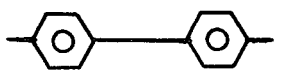

5. The poly(perfluoroalkylene oxide)oxadiazole of claim 1 in which R is

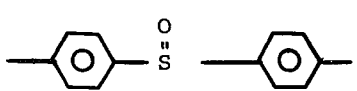

6. The poly(perfluoroalkylene oxide)oxadiazole of claim 1 in which R is

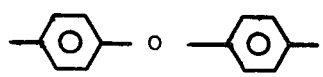

7. A process for synthesizing a poly(perfluoroalkylenes oxide)oxadiazole which comprises the steps of (1) adding to a reaction zone an aromatic dinitrile N-oxide; a perfluoroalkylene oxide dinitrile; 1,3,5-tricyanobenzene; and a fluorinated solvent in which the 1,3,5-tricyanobenzene is insoluble; (2) after the aromatic dinitrile N-oxide and the perfluoroalkylene oxide dinitrile have reacted with one another to form a polymeric material, adding to the reaction zone a solvent, misicible with the fluorinated solvent, in which the 1,3,5-tricyanobenzene is soluble; and (3) reacting the 1,3,5-tricyanobenzene with the polymeric material, thereby forming a terpolymer product.

8. The process according to claim 7 in which the aromatic dinitrile N-oxide and the perfluoroalkylene oxide dinitrile are reacted at a temperature in the range of about 10° to 35°C for a period of about 3 to 8 days; the 1,3.5-tricyanobenzene and the polymeric material are reacted at a temperature in the range of about 10° to 35°C; and the total reaction time for the two reactions ranges from about 4 to 13 days.

9. The process according to claim 8 in which the perfluoroalkylene oxide dinitrile has the following formula:

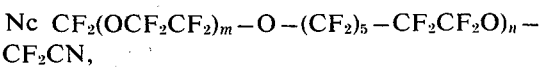

in which *m* and *n* are each an integer equal to at least 1 and the sum of *m* and *n* is in the range of 2 to 12, inclusive.

10. The process according to claim 9 in which the aromatic dinitrile N-oxide is N,N'-terephthalonitrile oxide; isophthalo-bis-(nitrile N-oxide); 1,5-naphthalene-bis(nitrile N-oxide); 4,4'-biphenyl-bis(nitrile N-oxide); 4'-benzonitrile oxide sulfone; or 4,4'-oxybis(-phenylnitrile N-oxide).

11. The process according to claim 10 in which the fluorinated solvent is trichlorotrifluoroethane, dichlorotetrafluoroethane, chloropentafluoroethane, or hexafluoroethane and the solvent for 1,3,5-tricyanobenzene is methylene chloride, chloroform, or trichloroethane.

12. The process according to claim 11 in which the amount of 1,3,5-tricyanobenzene constitutes about 1 to 80 mole percent of the total amount of 1,3,5-tricyanobenzene and perfluoroalkylene oxide dinitrile and the mole ratio of the amount of aromatic dinitrile N-oxide to the amount of 1,3,5-tricyanobenzene and perfluoroalkylene oxide dinitrile ranges from about 1 to 1.25.

13. The process according to claim 12 in which the terpolymer product is blended with 0.5 to 10 weight percent of a bis(nitrile oxide), based upon the weight of the terpolymer; the resulting blend is heated at a temperature ranging from about 100° to 300°F for a period of about 10 to 60 minutes; and a cured product is recovered.

14. The process according to claim 13 in which the bis(nitrile oxide) is N,N'-terephthalonitrile dioxide.

* * * * *

UNITED STATES PATENT OFFICE
CERTIFICATE OF CORRECTION

Patent No. 3,960,814           Dated June 1, 1976

Inventor(s) Robert E. Cochoy

It is certified that error appears in the above-identified patent and that said Letters Patent are hereby corrected as shown below:

Column 1, line 14 and line 42, "oxadiazles", each occurrence, should read --oxadiazoles--. Column 4, line 15, the formula "R(CNO)$_2$" should read --R(C≡N→O)$_2$--. Column 7, line 16, "poing" should read -- point--. Column 7, line 43, "emove" should read --remove--. Column 8, lines 26 and 27, the formula should read -- [NC-CF$_2$(OCF$_2$CF$_2$)$_m$-O-(CF$_2$)$_5$-O-(CF$_2$CF$_2$O)$_n$-CFCN--. Column 8, line 27, "1.35" should read --11.35--. Columns 9 and 10, in Table I$_4$ opposite Run J, "tough crepe gum" should read --tough crepe gum$^4$--.

Column 12, line 51, after "formula:" delete --R$_f$-X-R-X-R$_f$-x(-R-X--.

Column 12, line 61, "x" should read --X--. Column 14, lines 23 and 24, the formula should read --NC-CF$_2$(OCF$_2$CF$_2$)$_m$-O-(CF$_2$)$_5$-O-(CF$_2$CF$_2$-O)$_n$-CF$_2$CN--. Column 14, line 34, before "4' ", first occurrence, insert --4,--.

Signed and Sealed this

Seventh Day of December 1976

[SEAL]

Attest:

RUTH C. MASON  
Attesting Officer

C. MARSHALL DANN  
Commissioner of Patents and Trademarks